Jan. 24, 1961 H. N. JENKS 2,969,225
DETENTION AND MIXING APPARATUS FOR TREATING WASTE LIQUIDS
Filed Feb. 9, 1955 6 Sheets-Sheet 1

INVENTOR:
HARRY N. JENKS,
BY
Arthur Middleton
ATTORNEY

INVENTOR:
HARRY N. JENKS,
BY
Arthur Middleton
ATTORNEY

Jan. 24, 1961  H. N. JENKS  2,969,225
DETENTION AND MIXING APPARATUS FOR TREATING WASTE LIQUIDS
Filed Feb. 9, 1955  6 Sheets-Sheet 3

INVENTOR:
HARRY N. JENKS,
BY
ATTORNEY

Jan. 24, 1961 H. N. JENKS 2,969,225
DETENTION AND MIXING APPARATUS FOR TREATING WASTE LIQUIDS
Filed Feb. 9, 1955 6 Sheets-Sheet 6

INVENTOR
HARRY N. JENKS
BY
ATTORNEY

United States Patent Office 2,969,225
Patented Jan. 24, 1961

2,969,225

DETENTION AND MIXING APPARATUS FOR TREATING WASTE LIQUIDS

Harry N. Jenks, Palo Alto, Calif.

Filed Feb. 9, 1955, Ser. No. 487,055

3 Claims. (Cl. 259—95)

The present application is a continuation-in-part of my copending application Serial No. 285,643, now abandoned, filed May 2, 1952.

This invention relates to the purification and clarification of sewage, trade-wastes, or other organically polluted waste liquids. Sewage treatment usually follows one or the other of two general types. One of these is the activated sludge process, while the other is the trickling filter process. These are distinguished not only by the marked difference in the yielded sludges themselves, but operationally by the fact that in the trickling filter process the biologic organisms that are used to treat sewage are stationary on the discreet stones or cinders that make up the filter-bed medium. The bacteria and other biologic organisms of the filter bed form zoogloeal films on the stones. Sewage to be so treated is recycled from a settler and admixed with newly incoming sewage so that while the biologic organisms remain fixed, the sewage is brought to them. On the contrary, in a plant operated in accordance with the activated sludge process, the biologic organisms are maintained in motion through the sewage. Such organisms are established an maintained in an aerating tank wherein the liquid is well aerated to produce an aerobic environment conducive to activity of such organisms. Sludges from the two processes are noticeably different; activated sludge being more bulky than filter-bed sludge, but the former being somewhat more easily digested than the latter. Another difference is observable in the plant effluent. In the trickling filter process, effluent which has been stabilized as to its biochemical oxygen demand (B.O.D.) is not as sparkling clear as is the effluent from an activated sludge plant. Yet as a filter-bed plant is significantly cheaper, both as to installed and operating costs, as compared with an activated sludge plant, all of these factors must be correlated in determining which plant should be installed in a particular locality.

I have devised improvements on both types of such plants. My patent application Serial No. 221,964, filed April 20, 1951, now U.S. Patent No. 2,713,028, discloses a filter bed process of a new kind wherein the trickling filter-bed is significantly shallow and is fed at an extremely high rate so that an individual drop of sewage liquid transits the bed in a matter of seconds by virtue of which it serves as an excellent aerator for oxygenating the liquid. But there is associated with the shallow filter-bed, a detaining-and-mixing station that receives liquid from the filter-bed, and from which the liquid; after being treated in that station, is returned to the filter-bed for re-aeration.

My Patent No. 2,677,657 of May 4, 1954 discloses an activated sludge process of a new kind wherein the sewage liquid is aerated on a jump-baffle aerator of a special type and then flows to a detaining-and-mixing station similar to that referred to in my said application Serial No. 221,964. Briefly stated, the detaining-and-mixing station of said application and said patent comprises two hydraulically connected vortically swirling or rotating bodies of sewage liquid with the bodies of substantially equal size, into the peripheral portion of which any incoming liquid is submergedly and preferably tangentially delivered. As to the swirling bodies, one may rotate at a speed greater than the other, and they are connected at the bottom to a riser in which a column of liquid drawn from each body is forcibly lifted. Treated liquid is removed from the body other than the one to which newly incoming liquid is fed. The object of this invention is to improve the construction and operation of such a detaining-and-mixing station. More particularly, one of such improvements relates to the control of the vortices formed in the swirling bodies, while another relates to decreasing the pumping head required for re-circulation and/or aeration.

These objects can be realized by modifying in a particular way the detaining-and-mixing stations of the said application and the said patent or of my Patent No. 2,589,261, of March 18, 1952. So the novel main feature of this invention then comprises the ways and means for controlling the vortex in each of the swirling vortical bodies by being able (1) to stabilize the vortex so it will not wobble, oscillate or pulsate with consequent slopping of tank liquid over the sides of the tank and (2) to control selectively the elevation at which liquid is released from the vortical bodies into a rising liquid column, as well as the quantity of liquid released, thereby effecting maximum swirling and mixing within the bodies with the expenditure of minimum power-input. And another feature is the ways and means by which some of the liquid on the periphery of the vortex is peeled off to spill downwardly therefrom, thus achieving aeration where desired, while converting velocity head to static head in the vortex, a conversion which results in significant power saving in a sewage treatment plant.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within the metes and bounds of the claims; or of forms that are their functional as well as conjointly co-operative equivalents, and are therefore intended to be embraced by those claims.

Figure 1:
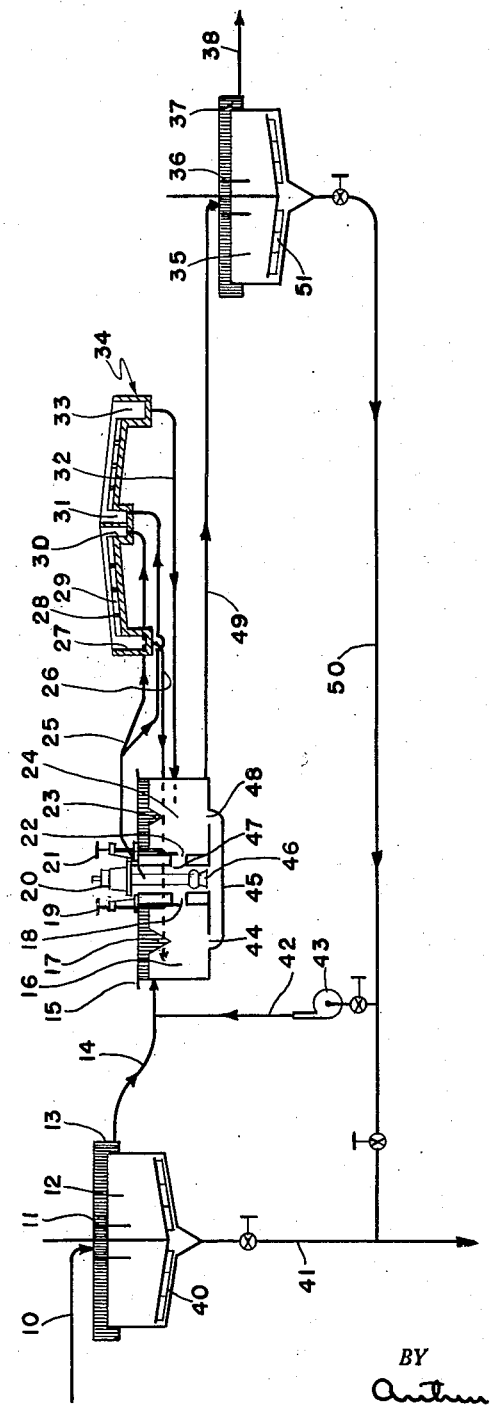
Figure 1 is a vertical sectional view somewhat symbolic of a flow sheet of a sewage treatment plant in which this invention has been embodied.
Figure 2:
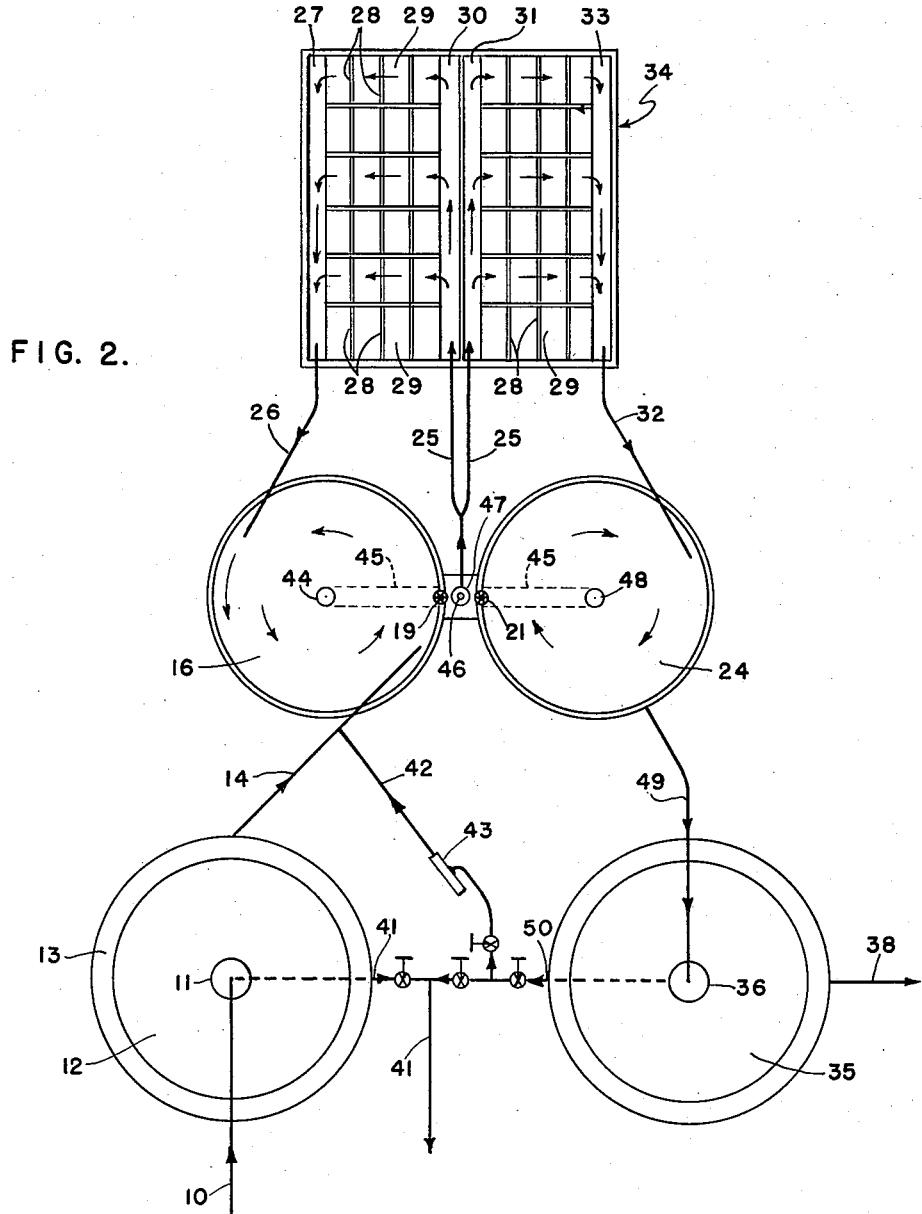
Figure 2 is a plan view of a preferred embodiment of the parts shown in side elevation in Figure 1.
Figure 3:
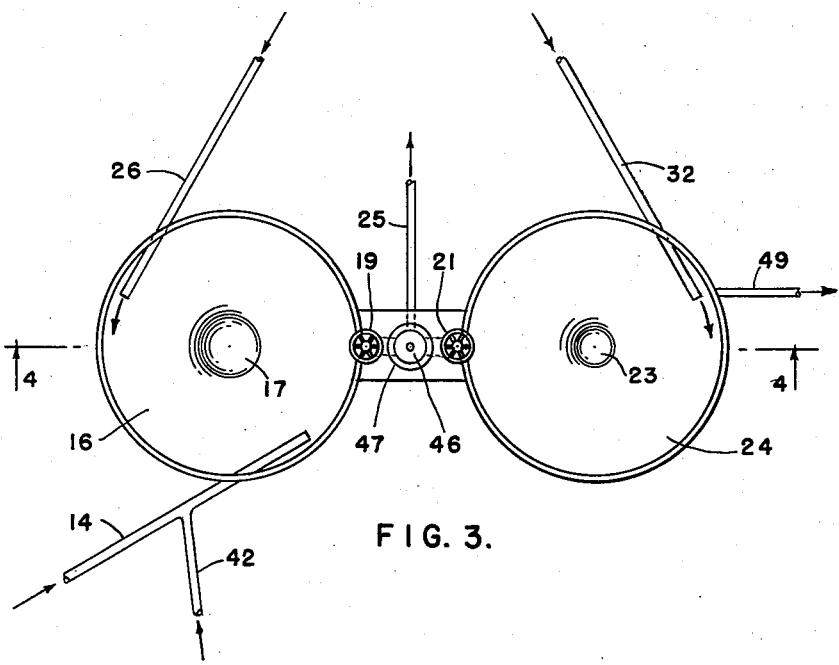
Figure 3 is a partial plan view of the detaining-and-mixing tank or station of this invention.
Figure 4:
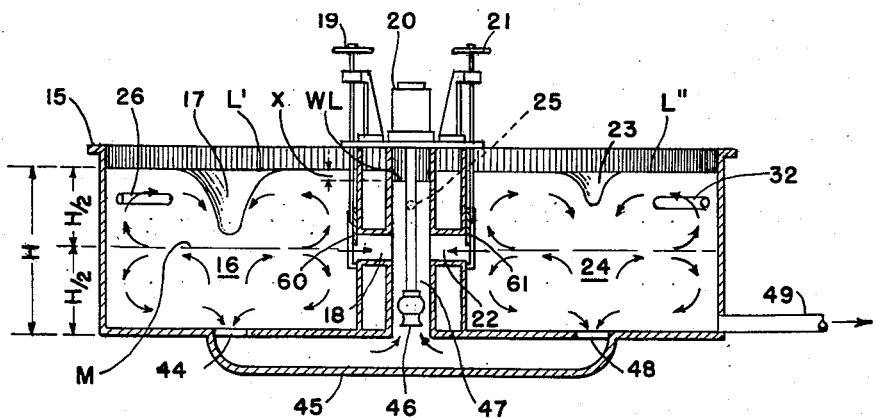
Figure 4 shows a vertical sectional view of the detaining-and-mixing station, in its elementary form.

In Figures 1 through 4, the organically polluted liquid such as sewage or other trade-wastes is preferably first supplied through a pipe 10 into a feedwell 11 of a primary clarifier or settler 12, preferably of the type that is cleaned by motor-driven sludge rakes 40 that rake the settled sludge to discharge through pipe 41. Clarified liquid from the settler overflows a weir into a launder 13 from which it exits through a pipe 14. Where the word "pipe" is used herein, it is intended to be broad enough to cover any appropriate type of conduit or launder or trench, and whatever desirable valves can be inserted therein to control the flow therethrough, whether actually shown on the drawing or not. Clarified sewage or any other desired type of polluted liquid is supplied through pipe 14 at vortex-inducing velocities to the detaining-and-mixing station or zone indicated collectively at 15. This station comprises two tanks or containers for holding therein respectively a body of liquid being treated, with the body in the first tank being the primary body 16 and the body in the second subsequent tank being the secondary body 24. These bodies are substantially the same size and both are vertically swirling bodies with each presenting a vortex 17 and 23 respectively. The space between the tanks has a riser column 47 in which is located a pump or air-lift 46 driven by a suitable motor 20.

The primary tank holding primary vertical body 16 has an outlet 44 located centrally in its bottom, while the subsequent tank holding secondary vertical body 24 has a similar outlet 48. These outlets lead to a hydraulic connection 45 therebetween that is also connected to the riser column 47. The primary tank has a by-pass conduit 18 at about its mid-height M leading into the riser column 47 as an inlet thereinto, and the other tank has a similar by-pass conduit 22 and inlet. By-pass conduit 18 is controlled by a vortex-controlling or vortex-stabilizing gate 60 adapted to close and open the inlet into that conduit by means of a handwheel or other control 19. Similarly, by-pass conduit 22 has a similar vortex-stabilizing gate 61, controlled as at 21. The vortex in the primary tank is indicated at 17, while the vortex in the subsequent tank is indicated at 23. The liquid-level of the primary tank is indicated at L' while the liquid level in the subsequent tank is indicated by L". The controlled liquid-level in the riser column 47 is indicated at WL. X indicates the difference in head between level L' and WL. Treated liquid from the detaining-and-mixing station 15 is discharged by way of pipe 49.

Liquid is conveyed from the riser column 47 between the tanks to an aeration station indicated generally at 34, for the purpose of oxygenating the liquid, namely, of increasing its content of oxygen in dissolved, absorbed and adsorbed form. Various types of aerators can be used here, even though my particular preference is for either a high rate trickling filter or for a deck aerator. The latter type is indicated at 34, and well described in my said Patent No. 2,677,657, but which may be briefly described as comprising one or more inclined decks 29, each having upstanding therefrom a plurality of baffles 28 over which liquid cascades in descending thereover from feed launders 30 and 31, to which launders liquid is supplied through pipes 25 from the riser column 47 in the detaining-and-mixing station 15. Liquid after cascading down and over the baffles 28, is caught in collecting launders 27 and 33, respectively, which conduct such aerated liquid back to the detaining-and-mixing station, through pipes 26 and 32, respectively. Pipe 26 delivers aerated liquid from launder 27 into the primary liquid body 16 tangentially and preferably at vortex-inducing velocities to contribute to its swirling. Aerated liquid from the other launder 33 is conducted through pipe 32 to be tangentially emitted at vortex-inducing velocities into the secondary liquid body 24 also for swirling it. This swirling of both bodies is to ensure the realization of a vortex in each. Thus, liquor drawn from both liquid bodies into the riser column 47 is conducted through pipes 25 to each of the deck aerators. After aeration on those aerators, the aerated liquid from one deck returns to the primary liquid body 16 while aerated liquid from the other deck aerator returns to the secondary liquid body 24. Since the primary liquid body will, in the embodiments shown in the drawings under discussion, receive two separate rotational or vortical impulses (one from the feed pipe 14 and another from the return pipe 26), this body swirls somewhat faster than the other body, so there is a larger and deeper vortex 17 in this primary body than the vortex 23 in the secondary body.

Liquid treated in the detaining-and-mixing station 15 is released from the secondary liquid body 24 through outlet pipe 49 which carries by gravity into the feedwell 36 of secondary clarifier or settler 35. This is preferably a mechanically-cleaned tank by means of moving sludge raking blades 51 suitably motor driven. So clarified and purified (depurated) liquid overflows a weir into launder 37 which discharges it through pipe 38, while settled activated sludge is normally continuously returned through pipe 50 and pump 43 to join pipe 14 carrying effluent from the primary clarifier 12 on its journey to the detaining-and-mixing station 15. Excess sludge is wasted into pipe 41 wherein it joins primary sludge going to a digester or to further treatment.

Figure 5:
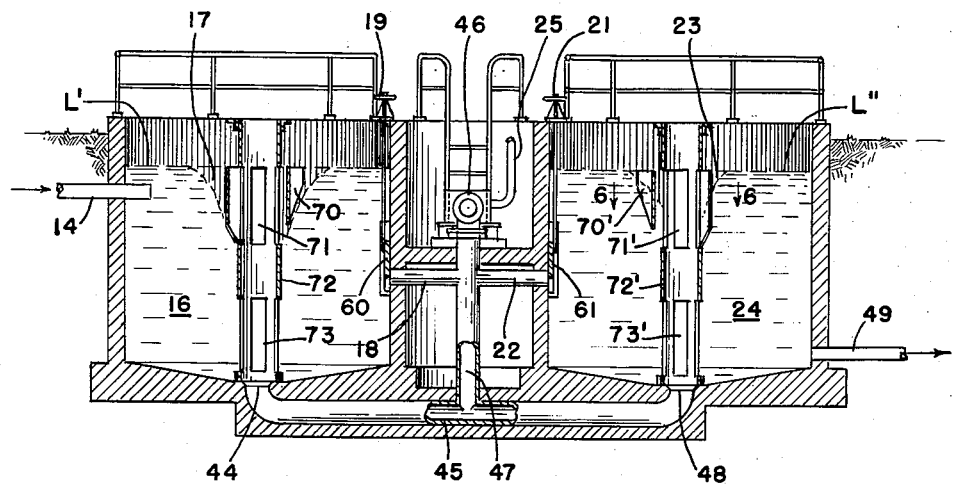
Figure 5 is a view similar to Figure 4 but with more details illustrated.
Figure 6:
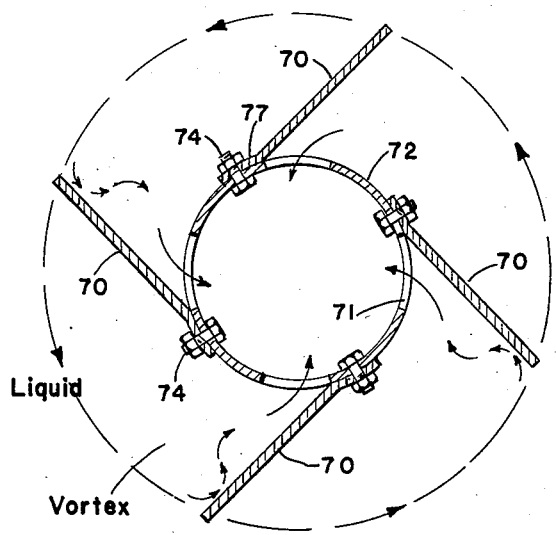
Figure 6 is a plan view of a detail.
Figure 7:
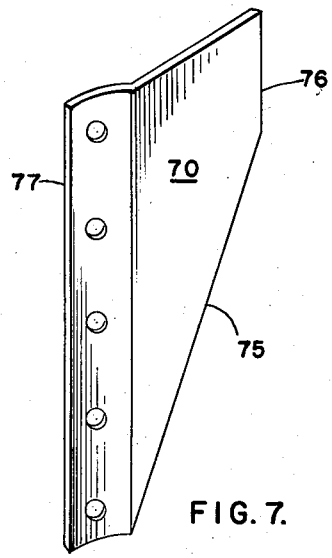
Figure 7 is an isometric view of a single detail.

Passing now to Figures 5 to 7, in the primary liquid body 16, there is an upstanding tubular element or tube 72 that is aligned with bottom outlet 44 in that tank. This tube is shown in cross-section in Figure 6. It has a plurality of elongated slots 73 in its lower section and another plurality of elongated slots 71 in its upper section. Extending tangentially from its upper section are a plurality of vortex-deflecting or vortex-suppressing blades or vanes 70 flaring outwardly to conform roughly to the contour of the vortex by having a curved inner edge 77 by which they are secured to the tube 72 by means of bolts or rivets 74. These vanes which are progressively less in width from top to bottom, as shown at inclined edge 75 in Figure 7, and which have an upper section that has a straight edge 76, are for peeling off liquid from the vortex to infold upon itself and enter the tube 72 (see Figure 6). In the secondary vortical liquid body 24, there is a similar structure, which will not be redescribed, but reference numerals have been merely primed. The vanes extend substantially tangentially from the tube 72 in a direction contrary to the direction of rotation of the liquid of the vortex, so that their edges peel off films of the liquid forming the periphery of the vortex, as that liquid attempts to pass by or around the stationary vanes.

The tanks holding the liquid bodies 16 and 24 are typically from 4 to 100 feet in diameter and from 6 to 8 feet deep. They have a detention capacity of the order of three hours upwards for so-called complete treatment, but of not less than one and one-half hours detention for intermediate treatment—that is, three hours detention (or one and one-half hours detention) based upon incoming raw or untreated liquid, not counting recycled liquid. Each tank is such that the feed thereto causes spiralized vertical flow therein with a peripheral speed of the order of from .5 to 1.5 feet per second. The peripheral speed of the liquid spiraling in each tank is such that flocs formed therein do not tend to be broken down or disintegrated.

Figure 8:
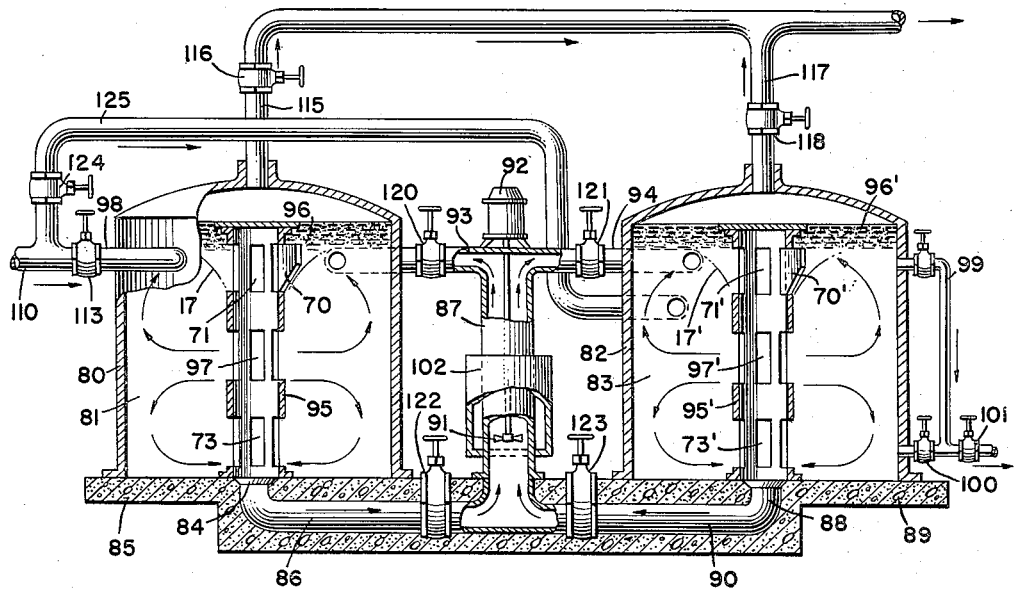
Figure 8 is a vertical part-sectional view of a sewage sludge digestion station embodying this invention.

Now we come to an embodiment of this invention for a different purpose, namely for anaerobic digestion of sewage sludge, which embodiment is illustrated in Figure 8. Here there are two enclosed digestion tanks, of which 80 is a primary digestion tank holding a primary vortical body of sewage sludge 81 undergoing biologic digestion, while 82 is a secondary digestion tank holding a secondary vertical body of sewage sludge 83 undergoing biologic digestion. Primary tank 80 has an outlet 84 in its bottom 85, leading to a conduit 86 with valve 122 for conducting sludge from the tank to an uprising column 87. Secondary tank 82 has an outlet 88 in its bottom 89, leading to a conduit 90 with valve 123 for conducting sludge from the tank to the uprising column 87. In the uprising column 87, there is an impeller 91 (or airlift as the case may be) operated from a motor 92 above the column 87. The top of the rising column 87 branches into one pipe 93 with valve 120 leading back into the tank 80 tangentially, while branch pipe 94 with valve 121 leads tangentially back to the tank 82.

In the primary tank 80, there is a centrally located upstanding tubular element or tube 95 rising to above the liquid level 96 in the tank and provided with a lower set of elongated longitudinally extending slots 73, a middle set of such slots 97, and an upper set of such slots 71. The upper set of slots 71, being similar to slots 71 in Figure 5, are provided as are the slots in that figure, with the vortex-deflecting or vortex-depressing vanes 70 of Figures 5, 6 and 7 around which circles the vortex 17, as in Figure 5. In Figure 5 the secondary tank 24, has the corresponding numerals primed, so that the same condition exists with secondary tank 82, as compared with primary tank 80, in Figure 8. Sewage sludge flowing through pipe 110 is fed tangentially to primary tank 80 by means of pipe 98 with valve 113. A by-pass pipe 125 with valve 124 emanating from pipe 110 can be utilized to discharge sludge tangentially directly into tank 82. Supernatant liquor is withdrawn from the upper region of the secondary tank 82 through valved pipe 99, that joins valved digested sludge discharge pipe 100 leading from the lower region of the secondary tank, so that either or both supernatent liquor or digested sludge can be sent to further treatment through valved pipe 101. Gases formed during the course of digestion in tank 80 are removed therefrom by means of pipe 115 with valve 116, while those originating in tank 82 are removed by means of pipe 117 with valve 118. 102 represents a heat exchange device encircling or in close association with the uprising column 87, through the medium of which sludge being propelled through the column 87 can be heated to a desired sludge digestion stimulating temperature.

Figure 9:
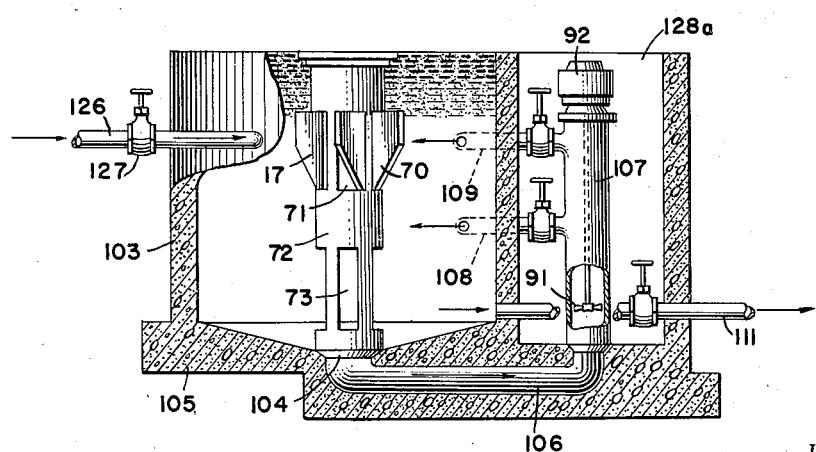
Figure 9 is a vertical part-sectional view of a station embodying this invention when used only as an agitator or mixer.

Next we come to the embodiment shown in Figure 9 where the vortex controlling phase of this invention is used as a simple but highly effective mixer in a single tank. In that figure 103 represents an open tank, having a central outlet 104 in its bottom 105 leading through conduit 106 to an uprising column 107, in which an impeller 91 (or airlift as the case may be) motivated by motor 92, forces liquid upwardly in the column 107 either to the elevation of the lower valved return pipe 108 or of the upper valved return pipe 109, both of which enter the tank 103 tangentially. Upstanding from the central bottom outlet 104, is the same construction of tubular element or tube 72 as is shown in Figure 5 with the same slots 71 and 73, plus the same vanes 70 serving to deflect liquid from vortex 17. Fluid mixtures to be mixed in the tank 103 are fed thereto tangentially by means of infeed pipe 126, with valve 127. After the contents of the tank are satisfactorily mixed, they are drawn therefrom through valved pipe 111. 128a represents a well useable for inspection of the elements 107, 108, 109, 111 and 91.

Figure 10:
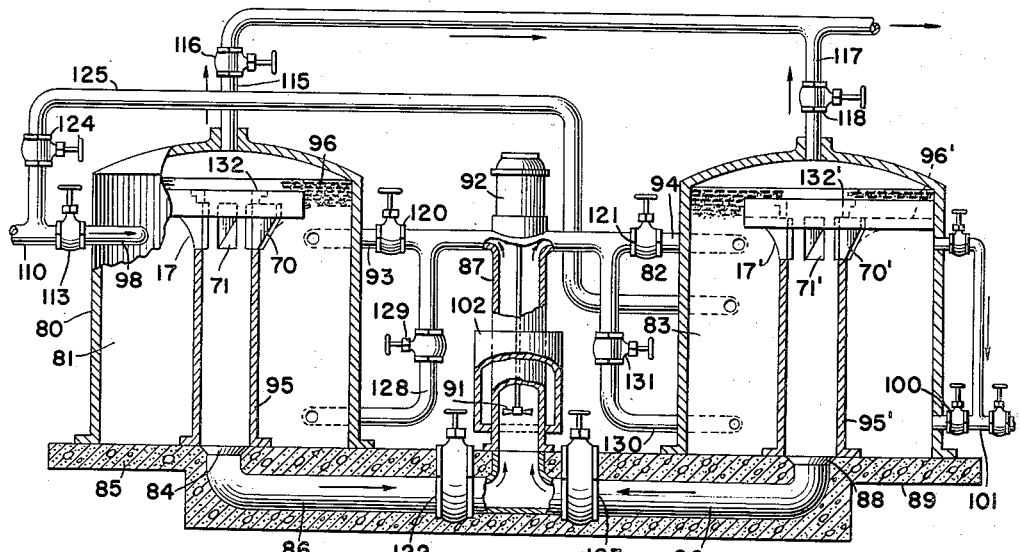
Figure 10 is a vertical part-sectional view of another sewage sludge digestion station embodying this invention.

The Figure 10 sludge digestion embodiment is similar to that of Figure 8 with the exception of the following additional features present in the Figure 10 embodiment. An additional tangential sludge feed line 128 with valve 129 is furnished for the recycling of sludge to a point in the lower portion of the bottom of tank 80, and the corresponding line pipe 130 with valve 131 is furnished for the recycling of sludge to a point in the lower portion of the bottom of tank 82. Also, in the Figure 10 embodiment a spiral scum deflector 132 partially submerged in the surface of the sludge body 81 is provided for deflecting scum forming at the surface into central riser column 95 by way of ports 71. The corresponding spiral scum deflector 132' is present in tank 82. Additionally, ports 97, and 73 have been eliminated from central column 95 in tank 80 and ports 97' and 73' have been eliminated from central column 95' in tank 82. In all other material respects the Figure 10 embodiment is identical with that of Figure 8. Thus, are provided two enclosed digestion tanks of which 80 is a primary digestion tank holding a primary vortical body of sewage sludge 81 undergoing biologic digestion while 82 is a secondary digestion tank holding a secondary vortical body of sewage sludge 83 undergoing biologic digestion. Primary tank 80 has an outlet 84 in its bottom 85, leading to conduit 86 with valve 122 for conducting sludge from the tank to an uprising column 87. Secondary tank 82 has an outlet 88 in its bottom 89, leading to a conduit 90 with valve 123 for conducting sludge from the tank to the rising column 87. In the uprising column 87, there is an impeller 91 (or airlift as the case may be) operated from a motor 92 above the column 87. The top of the rising column 87 branches, in this embodiment, into pipe 93 with valve 120 leading back into the tank 80 tangentially, pipe 128 with valve 129 also leading back into tank 80 tangentially but at a level lower than that of pipe 93, pipe 94 with valve 121 leading tangentially back to tank 82, and pipe 130 with valve 131 also leading back tangentially to tank 82 but at a level lower than that of pipe 94.

In the primary tank 80, there is a centrally located upstanding tubular element or tube 95 rising to above the liquid level 96 in the tank and provided with a set of elongated longitudinally extending slots 71. These slots, being similar to slots 71 in Figure 5, are provided, as are the slots in that figure, with the vortex-deflecting or vortex-depressing vanes 70 of Figures 5, 6 and 7 around which circles the vortex 17 as in Figure 5. In Figure 5 the secondary tank 24 has the corresponding numerals primed, so the same condition exists with secondary tank 82 as compared with primary tank 80 in Figure 10. Sewage sludge flowing through pipe 110 is fed tangentially into primary tank 80 by means of pipe 98 with valve 113. A by-pass pipe 125, with valve 124, emanating from pipe 110, can be utilized to discharge sludge tangentially directly into tank 82. Supernatant liquor is withdrawn from the upper region of the secondary tank 82 through valved pipe 99, that joins valved digested sludge discharge pipe 100 leading from the lower region of the secondary tank, so that either or both the supernatant liquor or digested sludge can be sent to further treatment through valved pipe 101. Gases formed during the course of digestion in tank 80 are removed therefrom by means of pipe 115 with valve 116, while those originating in tank 82 are removed by means of pipe 117 with valve 118. 102 represents a heat exchange device encircling or in close association with the uprising column 87, through the medium of which sludge being propelled through column 87 can be heated to a desired sludge digestion stimulating temperature.

Figure 11:
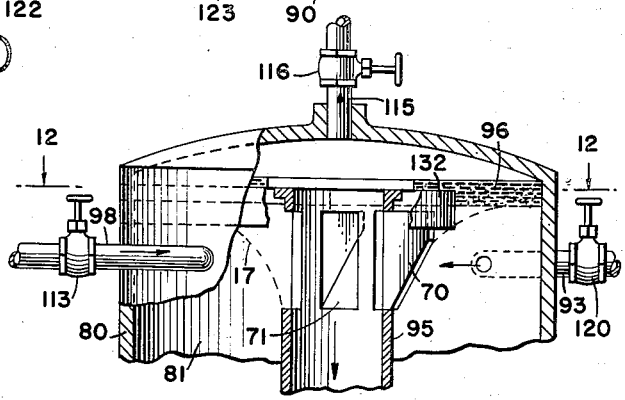
Figure 11 is an enlarged detail view of a portion of the Figure 10 embodiment with a section of the interior structure cut-away.

Figure 11 has been included to illustrate the upper portions of the tank shown in Figure 10 with greater clarity. While the numbering and the disposition of components correspond to that of primary tank 80, it should be noted that the elements are analogous with those of tank 82. In the figure, sludge enters tank 80 tangentially by means of pipe 98 with valve 113, and merges with the vertically swirling sludge body 81. A portion of the sludge present passes continuously through ports 71 and thence downwardly through central column 95. The vanes 70 serve to peel off liquid from the surface of vortex 17, and to deflect the liquid thus peeled off into the said ports 71, thereby reducing the depth of the vortex. Spiral deflector 132, partially cut-away in the illustration to show the top of the column structure, has its lower portion immersed in the sludge surface 96, and acts to skim floating scum present on the said surface, forcing it towards the center where it is picked up by the vortex 17 and mixed with the sludge passing through ports 71. As a consequence, the said scum is broken up and suspended in the sludge, whereby it is returned to the anaerobic bacterial decomposition process actively taking place in the swirling sludge body 81. As was the case with the Figure 10 embodiment, pipe 115 with valve 116 represents a digester gas discharge means. Pipe 93, with valve 120, represents a recycled sludge line, which may be utilized in lieu of a second lower recycle line, shown in Figure 10 as pipe 128 with valve 129, but not shown in Figure 11, as a means for re-introducing, at vortex inducing speeds, sludge previously withdrawn from the sludge body 81 through ports 71 as heretofore described.

Figure 12:
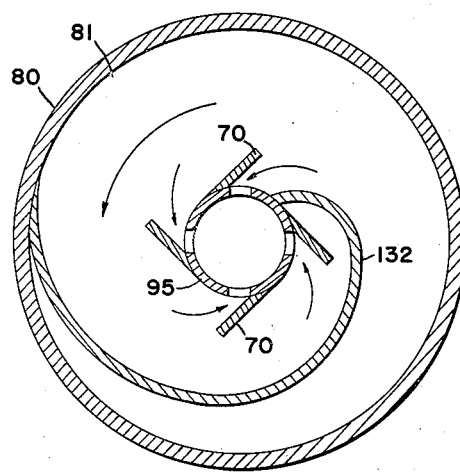
Figure 12 is a cross-sectional plan view along the line 12—12 of Figure 11.

Figure 12 further illustrates the shape and disposition of the spiral scum deflector 132 as used in embodiments of the type shown in Figure 10. The scum floating on the surface of the swirling sludge body 81, is engaged by the partially submerged deflector 132 and caused to move spirally inward along the upstream side of the deflector until it is caught up in the vortex and transferred through ports 71 into the central column 95. In the drawings, support for the scum deflector 132 is derived from attachment, by welding or otherwise, to the wall of the tank 80, and to the central column 95. If desired the said deflector can, of course, be supported by suitable members from the roof of the tank.

As already noted, the basic purpose and advantage of the holding-and-mixing tanks of this invention is the securing of thorough and adequate mixing of the liquid flowing through the system, with the minimum power input. This is accomplished by taking advantage of the optimum hydraulic conditions inherent in the vertically swirling bodies, wherein not only is there a mixing action due to the rotation of the bodies as such, but also due to the hydraulically-induced mixing currents in the vertical planes throughout the mixing tanks, as shown by the arrows in Figure 4. The creation of the vortex itself presents the opportunity of folding the vortex in upon itself by means of vortex-deflecting or vortex-suppressing vanes 70, thus where desired, to entrain a substantial amount of atmospheric oxygen, in addition to that absorbed through the surface of the liquid in the tank as a whole, through the repeated presentation of new surfaces to the atmosphere as a result of the general mixing action within each tank.

The vortex should be as large as possible, consistent with reasonable loss of head through the system, for this aids and abets the mixing action. However, during periods of high rates of feed input, the swirling action in the vortex tanks becomes or tends to become too violent so the vortices increase unduly and converts the static head over the central outlet in the bottom of the tank into velocity head to an extent that the water-level WL in he liquid column in the riser between the tanks drops to an undesirable low elevation, inasmuch as this elevation is the one from which the pump 46 has to lift the recirculating liquid flow to the elevation of the aerating decks 29. By pumping some of the flow of recirculation from the mid-plane M of the tanks, through the by-pass conduits or connections 18 and 22, instead of pumping everything through the bottom hydraulic connection 45, the size of the vortices can be controlled, and excessive loss of head avoided, independently of the volume of flow through the system (rate of feed into the primary settler and discharge from the secondary settler).

An unexpected result of the arrangement within the vertical body holding tanks, is that of increasing the static head over central bottom outlets 44 and 48, and producing a corresponding rise in the elevation of the liquid surface WL in the riser column 47. If some of the rotational velocity head is not so recovered, the pressure head at the central bottom outlet from the tank may be reduced by the velocity head of the vortex to a point where the said riser column liquid surface might stand several feet below the liquid levels in the tanks, and thus materially increase the static lift to the elevation of the deck aerator. It is for this reason that the vortex controller is used, which comprises the gated by-pass connections 18 and 22 between each tank and the riser column 47. By adjusting the opening of the gates 60 and 61 respectively, it is possible to by-pass the flow from each mixing tank from the central bottom outlet 44 and 48 and thus diminish the swirling vortex to any desired degree. Thus, this invention teaches how to provide two means for controlling the vortices; one is the vortex-deflector or suppressor and the other is the vortex-controller or stabilizer. The former spills liquid around the vortex in upon itself within the vortex with concomitant aeration where desired and decrease of loss of head, while the latter accomplishes conversion of velocity to static head in the region of the vortex.

The following data will cover a typical example of the contemplated mode of practicing this invention in the treatment of sewage by using a vortex by-pass or controller and a vortex deflector or suppressor:

Two mixing tanks, each 80 ft. in diameter by 8 ft. sidewall depth, connected at the bottom by a conduit 4 ft. in diameter, having an uprising central column that is 4 ft. in diameter, in which riser column 47 is located a pump 46 having a capacity of 25,000 gallons per minute.

The difference in elevation between the liquid level L' substantially common to these two tanks on the one hand, and on the other the liquid level in the jump baffle aerator 34, is 3½ ft. That means that liquid flowing from the jump-baffle aerator back to these tanks will flow by gravity down an incline equal in vertical descent to 3½ ft.

As to the primary body 16 (wherein the vortex is always larger than the secondary body 24), the vortex 17 formed by the gravity feed of sewage thereto, plus the pumping of sewage from the bottom 44 thereof, will have a normal diameter of 4 ft. and a depth of 6 ft.

The vortex controller gate 60 in the conduit 18 in the sidewall of the tank containing the primary body 16 leading to the riser column 47 will have a diameter of 24 in. and an appropriate slide gate. By the manipulation of this gate 60, the vortex may be controlled to minimize oscillation or pulsations of the tank contents, thus quieting the contents of the tank positionally and elevationally to continue to present a fairly constant water-surface level common to both tanks. This has a stabilizating effect but does not necessarily sufficiently reduce the loss of head through the system by virtue of the decreased static head within the space bounded by the vortex.

To overcome this disadvantage, there will be used a vortex deflector comprising essentially an upstanding tube 72, 4 ft. in diameter, aligned with the discharge outlet 44 in the tank bottom and extending upwardly to an elevation above the water surface. It will have laterally extending vanes 70 triangularly shaped and set tangentially to the tube. Maximum tangential extension of these vanes would be 2 ft., so that when liquid rotates around them, they will have a zone of influence of approximately 8 ft. in diameter. The size of the vertical slots 71 adjacent the vanes is 3 ft. 6 in. long by 18 in. wide. The size of the slots 73 at the bottom of the tube is the same. The effect of this device is to fold the walls of the vortex in upon themselves; that is, whereas naturally the bottom of the vortical space is about 4 ft. below the water surface, when the deflector vanes are used, the bottom of the vortical space is only about 6 in. below the water surface, so the net gain in static head is 3½ ft. Accordingly, the deflector converts the velocity head of the vortex into static head, which thereby decreases correspondingly the pumping head of recirculation.

I claim:

1. A continuously operable detention-and-mixing station, for treating poluted waste liquids, having a substantially cylindrical tank adapted to hold a vortically swirling body of liquid provided with a feed inlet and means for discharging liquid treated in the body, a lower conduit extending from the tank bottom, an upper conduit extending substantially tangentially into the tank in its upper section, a riser column communicatively extending from the lower conduit to the upper conduit with an inlet into the riser from the lower conduit and an outlet from the riser into the upper conduit, liquid-lift means in the riser for pumping liquid through the lower conduit upwardly through the riser and discharging the liquid tangentially back into the tank through the upper conduit at vortex-inducing speed, axially located tubular means communicating with the lower conduit in the tank bottom and extending upwardly into the region of the vortex having openings in its upper section, and means for converting velocity head of the vortex into static head in the riser column comprising vortex supressing and deflecting vane means having blades extending from the tubular means in its upper section with the outer edges angled against the direction of flow of the vortex for peeling off and infolding liquid from the periphery of the vortex to spill downwardly through the openings into the tubular means to be conducted by the latter on its way to the lower conduit and into the riser column.

2. Apparatus according to claim 1, with the addition of means for stabilizing the surface of the swirling body of liquid comprising a valved conduit through which additional liquid can be withdrawn from the tank at a place functionally remote from the axis of rotation of the liquid body in the tank and delivered into the riser column.

3. A continuously operable detention-and-mixing station for treating polluted waste liquid, comprising two substantially cylindrical tanks of substantially equal size each adapted to hold a vortical swirling body of liquid, with the primary tank having a feed inlet and the secondary tank having an outlet functionally remote from its feed, a conduit connecting the tank bottoms, a riser extending from the conduit with an inlet into the riser from each tank adapted to hold a column of mixed liquid drawn from said tanks, liquid-lift means in the riser for pumping liquid upwardly therein and discharging it tangentially back into the said tanks at vortex inducing speeds, a pipe in each tank connected with the bottom outlets thereof extending upwardly into the region of the vortex, having slots in its lower section and slots in its upper section, and vane means extending from the pipe in its upper section for peeling off liquid from the periphery of the vortex to spill through the upper slots into the pipe while liquid from the bottom section of the tank flows through the lower slots in the pipe and central tank outlet.

References Cited in the file of this patent

UNITED STATES PATENTS

| Number | Name | Date |
|---|---|---|
| 138,089 | Holdam | Apr. 22, 1873 |
| 353,775 | Booraem | Dec. 7, 1886 |
| 1,301,544 | Crombie | Apr. 22, 1919 |
| 1,902,078 | Jenks | Mar. 21, 1933 |
| 1,989,589 | Fischer et al. | Jan. 29, 1935 |
| 2,326,303 | Moerk et al. | Aug. 10, 1943 |
| 2,677,657 | Jenks | May 4, 1954 |
| 2,694,043 | Jenks | Nov. 9, 1954 |
| 2,713,028 | Jenks | July 12, 1955 |